July 31, 1962  J. VLACH  3,046,939
ROTARY FEEDER FOR CAGES
Filed Dec. 27, 1960  2 Sheets-Sheet 1

INVENTOR.
JERRY VLACH
BY
*Sanford Schnurmacher*
ATTORNEY.

July 31, 1962  J. VLACH  3,046,939
ROTARY FEEDER FOR CAGES
Filed Dec. 27, 1960  2 Sheets-Sheet 2

INVENTOR.
JERRY VLACH
BY Sanford Schnurmacher
ATTORNEY.

United States Patent Office 3,046,939
Patented July 31, 1962

3,046,939
ROTARY FEEDER FOR CAGES
Jerry Vlach, 6740 Dunham Road, Bedford, Ohio
Filed Dec. 27, 1960, Ser. No. 78,390
2 Claims. (Cl. 119—18)

This invention relates to a novel rotary feeder for caged animals and is particularly applicable to the feeding of ranch raised, fur-bearing animals such as mink, fox, marten, and the like.

The primary object of this invention is to provide a feeder adapted to be mounted at an opening in the wire netting or screening of an enclosure, to enable the confined animal to be fed without requiring the keeper to put his hand or any part of his person, within the cage or pen.

Another object is to provide a feeder of the type stated that is escape-proof and which materially reduces the time required for feeding animals since no latches are involved which have to be unlatched and re-latched in accomplishing the feeding operation.

Another object is to provide a feeding table that is gravity-mounted in locked position without the use of springs or levers and which cannot be unlocked from the inside by the caged animal, either by pushing outwardly against the table, or raising the table from the underside.

A further object is to provide a feeder having a smooth rotating table which may be very readily cleaned and maintained in a sanitary condition, and wherein one-half of the feeder table may be cleaned while the second half thereof is in feeding position, thereby eliminating the need for cleaning the feeder between feedings, as is necessary with other feeders.

Still another object of the invention is to provide a device of this character which may be very economically constructed from sheet metal stampings of novel formation, and which may be readily mounted upon the wire netting or fencing forming the cage or enclosure in which the animal is kept.

These and other objects of the invention will become apparent from a reading of the following specification and claims, together with the accompanying drawings, wherein like parts are referred to and indicated by like reference numerals, and wherein:

Figure 1:
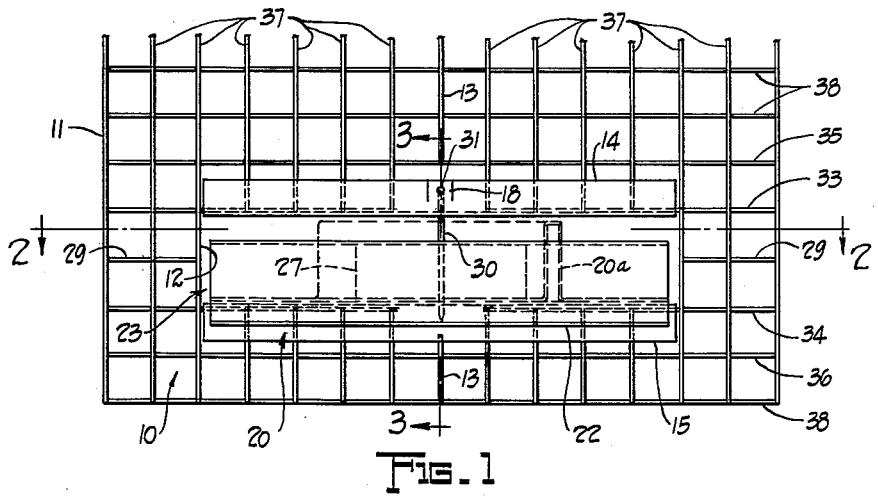
FIGURE 1 is a front elevation of the Rotary Type Feeder for Cages, that is the subject of this invention, showing it mounted on a cage wall in alternate locked and unlocked positions.

Referring more particularly to the drawings, there is seen the Rotary Feeder for Cages, that is the subject of this invention, broadly indicated by reference numeral 10, as it appears mounted in an opening of the screen mesh of a cage 11. The mesh 11 may be made of wire, rods or bars of suitable gauge, having the required physical properties to restrain the particular animal in question, in this case a mink.

In the preferred form shown, the cage mesh 11 is made of criss-crossed horizontal and vertical wires 29, 33, 34, 35, 36, 38, and 13, 37 respectively, as seen in FIGURE 1.

For caging mink, a so-called 1" wire mesh is used, that is, the crossed wires form openings approximately 1" square.

A rectangular opening 12 is formed in the front wall of the cage by removing a horizontal section of the wire 29 and then cutting all the vertical wires, 13 and 37, back to the horizontal wires 33 and 34, next above and below the wire 29, as seen in FIGURE 1. This forms an elongated opening 12 that is 2" wide and 10" long, in the example illustrated.

Reference numerals 14 and 15 indicate two sheet metal anchor strips which are bent upon themselves to form a U-shaped structure that is fitted over the top and bottom edges of the opening 12 and clinched, or otherwise fastened, to the wires 33 and 34, respectively.

The so mounted anchor strips have bearing holes 16 and 17 which are aligned with each other and the center vertical wire 13 in the opening 12. The wire 13 is cut back to the horizontal wires 35 and 36 leaving a space for the ends of the hereinafter described shaft 30.

Reference numeral 18 indicates a shaft lock tab cut in the outer face of the anchor strip 14. The tab 18 has a lock hole 19, as is shown most clearly in FIGURE 4.

The so attached anchor strips 14 and 15 present two parallel and opposed smooth surfaces extending the length of the opening 12.

Figure 2:
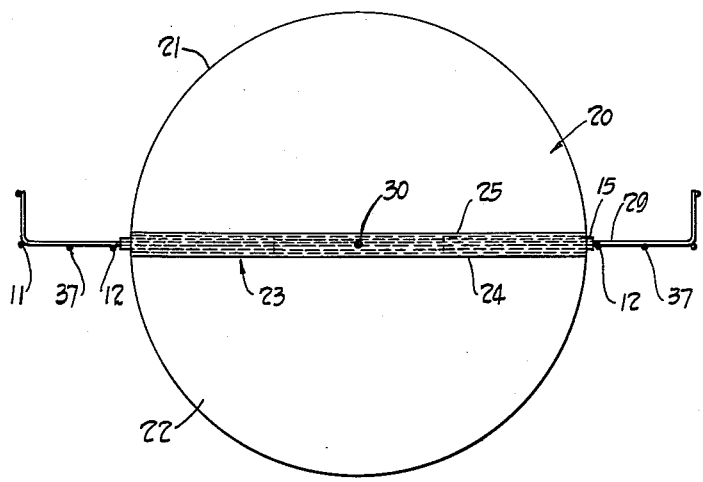
FIGURE 2 is a top view taken along the line and in the direction of the arrows 2—2 of FIGURE 1.
Figure 4:
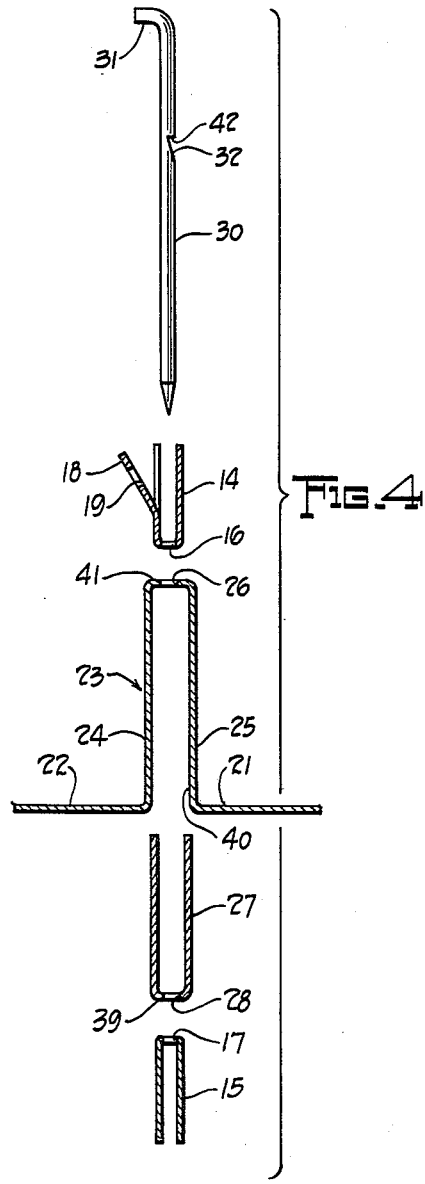
FIGURE 4 is an exploded sectional view of the unmounted device.

A rotor, broadly indicated by reference numeral 20, which is likewise preferably formed of sheet metal, comprises a disk having an upwardly projecting diametrically extending rib or gate 23, including spaced parallel side walls 24 and 25, as seen most clearly in FIGURES 2 and 4, which are joined by a flat cap 41 at the top thereof, to form a vertical channel 40 therebetween. The cap 41 has a centered bore 26.

The gate 23 is preferably an integral part of the disk, constituting an upwardly pressed diametrically extending portion thereof. The rotor disk includes two corresponding co-planar portions or segments 21 and 22, which extend outwardly from the bottom edges of the gate walls 25 and 24, respectively, and the outer edges of which are concentrically disposed relatively to the center of the rotor cap bore 26.

Figure 3:
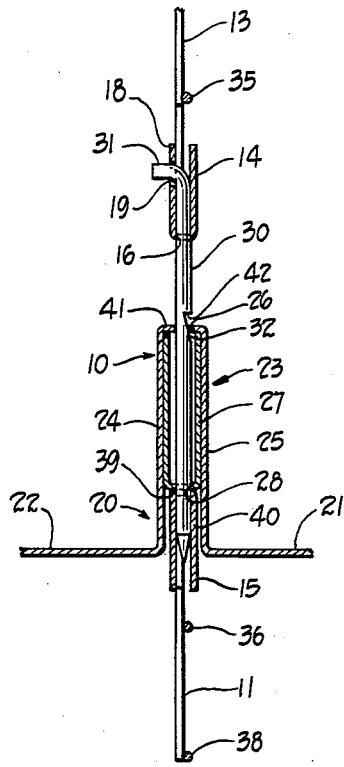
FIGURE 3 is a vertical sectional view taken along the line and in the direction of the arrows 3—3 of FIGURE 1.

Reference numeral 27 indicates a U-shaped sheet material bearing element that is wedged or otherwise mounted in the channel 40, between the insides of the gate walls 24 and 25, with its horizontal surface 39 faced downward and spaced upwardly of the plane of the lower surfaces of the disk segments 21 and 22, as seen most clearly in FIGURE 3.

The bearing element 27 has a bore 28 through its horizontal face 39 which is aligned with the bore 26 of the gate cap 38. When used with a 1" wire mesh cage, the bearing surface 39 is positioned approximately ½" above the disk plane.

The space between the gate walls 24 and 25 is such that the channel 40 can be slidably fitted over the lower anchor strip 15, as seen in FIGURE 3.

The rotor 20 is mounted in the opening 12 by means of a pin or shaft 30 which extends through the several aligned bores 16, 26, 28 and 17.

The shaft 30 has a notch 32, terminating in a horizontal shoulder 42 and a head portion 31 bent at 90° to shaft body on the side opposite the notch 32.

The so-engaged shaft is locked immovably in place by bending the tab 18 upward into a vertical plane with the head 31 of the shaft 30 extending through the tab bore 19, as seen in FIGURE 3.

When the rotor channel 40 is aligned with the anchor strip 15, the rotor 20 falls, due to the pull of gravity, to its locked position, as seen in FIGURES 1 and 3, wherein the upper portion of the anchor strip is nested within the channel 40, with its upper edge supporting the face 39 of the bearing element 27.

This prevents rotation of the gate element 23 and attached feeder disk segments 21 and 22.

The rotor 20 is thus securely locked against rotation no matter how much outward rotative pressure is exerted on the gate 23 by the confined animal. Furthermore, if upward pressure is exerted on the disk segment 21, that is on the inside of the cage, by the confined animal, the edge of the bore 26 of the gate cap 38 will tilt into engagement with the downwardly faced shoulder 42 of the shaft notch 32 to lock the rotor against vertical movement.

However, if upward pressure is brought to bear upon the outside disk segment 22, the edge of the cap bore 26 is tilted inwards and away from the notch shoulder 42 so that the rotor 20 can be moved up the smooth outer face of the shaft 30 until the channel 40 clears the upper edge of the lower anchor strip 15, to take the position indicated in dotted outline and identified by reference numeral 20a in FIGURE 1.

The rotor gate is now loosely positioned between the upper and lower anchor strips 14 and 15, respectively, and is free to be rotated therebetween on the shaft 30 with the lower faces of the disk segments 21 and 22 riding on the top face of the anchor strip 15.

It will easily be perceived that unless the rotor 20 is intentionally held upward against the pull of gravity, the rotor 20 will lock itself in place after a ½ revolution, or as soon as the channel 40 and anchor strip 15 are again aligned, at which instant the rotor will fall into nested engagement with the anchor strip 15, as seen in FIGURE 3.

No latches, springs, pressure plates, or levers are required to automatically re-lock the rotor 20.

Since the bearing surface 39 of the channel 40 is positioned ½″ upwardly of the open edge of the channel 40, the rotor 20 can descend only ½″ into its locked position, thereby leaving not more than a ½″ space at the top of the gate element 23, which is too small for the animal to slide through.

By referring to FIGURE 2, it will be evident that when food is placed on disk segment 22 and the rotor 20, rotated as described above, the segment 21 will move into position outside the cage wall 11 as segment 22 moves into the cage to take the position vacated by segment 21. Thus, food left on feeder segment 21, from the previous feeding, can be disposed of at feeding time, without requiring a separate cleanup trip on the part of the keeper.

Since the rotor 20 is held locked solely by the pull of gravity, there is no possibility that the locking action will deteriorate and become weaker with age, as may be the case where springs or latches are used.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with a cage or enclosure wall having a horizontally elongated opening therein, a rotary type feeder of the character described, comprising, two anchor strips adapted to be secured to the upper and lower horizontal edges of the opening in opposed parallel alignment; a shaft immovably supported by and between said anchor strips and extending across said wall opening; and, a rotor mounted on the shaft for rotation in the opening between the two anchor strips, said rotor comprising a disk having an upstanding diametrically extending gate dividing the rotor disk into separate feed supporting segments normally extending from opposite sides of said wall opening and one of which is disposed on the inner side of said opening in feeding position, the gate having a longitudinally extending channel in the lower face thereof between the disk segments; the rotor being movable vertically of the shaft between a first, normal position wherein the lower anchor strip is nested within the rotor channel, whereby the rotor is locked against movement in either direction from a position in which the gate is disposed to close the wall opening; and a second, raised, position, wherein the rotor channel is clear of the lower anchor strip with the lower surface of the rotor disk bearing on top of the lower anchor strip, for rotation thereon, whereby the disk segment may be interchanged inwardly and outwardly of the cage opening, upon which occurrence the rotor will automatically fall back into its first position, under the pull of gravity.

2. A rotary feeder as in claim 1, said shaft having a shouldered notch on its inward side forming a stop engageable with the top of the gate, when upward pressure is exerted on the disk segment aligned with the notch, to prevent raising the rotor to its second position.

References Cited in the file of this patent

UNITED STATES PATENTS

| | | |
|---|---|---|
| 1,602,000 | Custer | Oct. 5, 1926 |
| 2,753,840 | Patrie et al. | July 10, 1956 |